United States Patent
Legrand et al.

(10) Patent No.: US 12,434,654 B2
(45) Date of Patent: Oct. 7, 2025

(54) VEHICLE TRIM COMPONENT AND PRODUCTION PROCESS FOR SUCH TRIM

(71) Applicant: FAURECIA INTERIEUR INDUSTRIE, Nanterre (FR)

(72) Inventors: Pierre Legrand, Beauvais (FR); Jean-Louis Torrecillas, Beauvais (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 302 days.

(21) Appl. No.: 17/975,109

(22) Filed: Oct. 27, 2022

(65) Prior Publication Data

US 2023/0131895 A1 Apr. 27, 2023

(30) Foreign Application Priority Data

Oct. 27, 2021 (FR) ...................................... 2111397

(51) Int. Cl.
*B60R 21/2165* (2011.01)
*B60R 13/02* (2006.01)
(Continued)

(52) U.S. Cl.
CPC ............ *B60R 21/215* (2013.01); *B60R 13/02* (2013.01); *B60R 21/205* (2013.01);
(Continued)

(58) Field of Classification Search
CPC . B60R 21/215; B60R 21/2165; B60R 21/205; B60R 21/217; B60R 21/20;
(Continued)

(56) References Cited

U.S. PATENT DOCUMENTS 6,152,480 A * 11/2000 Iwanaga ............. B29C 44/1228
280/232
6,406,056 B2 * 6/2002 Yokota .................. B60R 21/205
280/732

(Continued)

FOREIGN PATENT DOCUMENTS

CN 206426987 U * 8/2017
EP 2888090 A1 7/2015

(Continued)

OTHER PUBLICATIONS

Preliminary Research Report corresponding to French Application No. 2111397, dated May 19, 2022, 2 pages.

*Primary Examiner* — Keith J Frisby

(74) *Attorney, Agent, or Firm* — Reising Ethington P.C.

(57) ABSTRACT

A vehicle trim component and a production process for the component. The trim component includes: a thermocompressed support panel provided with an opening and a peripheral edge surrounding the opening; an airbag guiding part having a channel arranged in the opening of the support panel, a flap at least partially closing a first end of the channel, and a collar arranged around the channel in the extension of the flap; and a reinforcing frame suited to fix the position of the guiding part relative to the support panel. The peripheral edge of the support panel is attached against the (Continued)

collar, and the reinforcing frame is a part brought in and force fit around the channel and fixed to the peripheral edge of the support panel.

13 Claims, 3 Drawing Sheets

(51) Int. Cl.
    *B60R 21/205*     (2011.01)
    *B60R 21/215*     (2011.01)
    *B60R 21/217*     (2011.01)
    *B29L 31/30*     (2006.01)

(52) U.S. Cl.
    CPC ........ *B60R 21/2165* (2013.01); *B60R 21/217* (2013.01); *B29L 2031/3038* (2013.01); *B60R 2013/0287* (2013.01)

(58) Field of Classification Search
    CPC ............ B60R 13/02; B60R 2021/2172; B60R 2021/21537; B60R 2013/0287; B29K 2105/12; B29K 2311/00; B29K 2311/10; B29K 2311/14; B29K 105/12; B29K 311/00; B29K 311/10; B29K 311/14; B29C 43/00; B29C 43/003; B29C 43/18; B29L 2031/3038
    USPC .................................. 280/728.2, 728.3, 732
    See application file for complete search history.

(56) References Cited

U.S. PATENT DOCUMENTS

| | | | | |
|---|---|---|---|---|
| 6,457,744 | B1 * | 10/2002 | Tonooka | B60R 21/231 |
| | | | | 280/743.1 |
| 6,716,519 | B2 * | 4/2004 | Ueno | B32B 27/20 |
| | | | | 428/323 |
| 6,726,239 | B1 * | 4/2004 | Teranishi | B60R 21/2165 |
| | | | | 280/732 |
| 7,434,828 | B2 | 10/2008 | Okamoto et al. | |
| 7,914,039 | B2 * | 3/2011 | Mazzocchi | B60R 21/205 |
| | | | | 280/732 |
| 8,783,711 | B2 * | 7/2014 | Webber | B60R 21/215 |
| | | | | 280/732 |
| 2003/0234521 | A1 * | 12/2003 | Schenck | B60R 21/215 |
| | | | | 280/728.3 |
| 2006/0017268 | A1 | 1/2006 | Bondoerffer | |
| 2006/0103117 | A1 | 5/2006 | Hayashi | |
| 2015/0217712 | A1 | 8/2015 | Cowelchuk et al. | |
| 2016/0288381 | A1 * | 10/2016 | Lard | B60R 21/215 |
| 2017/0182729 | A1 | 6/2017 | Fox et al. | |
| 2019/0092269 | A1 * | 3/2019 | Ishida | B60R 21/2334 |
| 2019/0225179 | A1 | 7/2019 | Nogaret | |

FOREIGN PATENT DOCUMENTS

| | | | | |
|---|---|---|---|---|
| EP | 3851336 | A1 * | 7/2021 | ........... B60R 21/205 |
| FR | 2987585 | A1 * | 9/2013 | ........... B60R 21/216 |
| JP | 2007118859 | A * | 5/2007 | |
| JP | 4426878 | B2 | 3/2010 | |
| JP | 2010069854 | A | 4/2010 | |

\* cited by examiner

VEHICLE TRIM COMPONENT AND PRODUCTION PROCESS FOR SUCH TRIM

TECHNICAL FIELD

The invention relates to a trim or dress component for a vehicle in particular for an automotive vehicle. The invention also relates to a production process for such trim component.

BACKGROUND

The automotive industry seeks to reduce the number of plastic parts and use more and more parts of natural origin that are more easily recyclable. For this purpose, trim components such as for example the instrument panel are made from support panels comprising natural fibers. It is necessary to attach airbag guiding parts to these panels in order to meet safety needs. However, for some panels, the guiding part is not solidly attached. In other panels, the interface between the guiding part and the support panel is not flat.

Further, attaching an airbag guiding part to a fibrous support panel by a hot-pressing process with overmolding of a reinforcement on a support panel is known. However, this process is complicated and inconvenient because the molding is very complex and because only some plastic materials can be used because of the adhesion capacity thereof. Further, the fact that the reinforcement is overmolded directly on the support panel leads to an undesirable deformation of the support panel because of shrinkage of the reinforcement during cooling thereof.

SUMMARY

A first goal of the invention is to solidly secure an airbag guiding part to a fiber support panel. A second goal of the invention is to attach an airbag guiding part to a support panel while keeping a flat interface between the guiding part and the support panel.

A third goal of the invention is to attach an airbag guiding part to a support panel in a precise position of the support panel.

The present invention relates to a vehicle trim component, where the trim component comprises:
  a thermocompressed support panel provided with an opening and a peripheral edge surrounding the opening;
  an airbag guiding part comprising a channel arranged in the opening of the support panel, a flap at least partially closing a first end of the channel and a collar arranged around the channel in the extension of the flap, where the peripheral edge of the support panel is attached against the collar;
  characterized in that it further comprises a reinforcing frame suited to fix the position of the guiding part relative to the support panel, where the reinforcing frame is a part brought in and force fit around the channel and attached to the peripheral edge of the support panel.

The features disclosed in the following paragraphs may, optionally, be implemented. They may be implemented independently of each other or in combination with each other: The trim component comprises:
  a thermocompressed support panel provided with an opening and a peripheral edge surrounding the opening;
  an airbag guiding part comprising a channel arranged in the opening of the support panel, a flap at least partially closing a first end of the channel and a collar arranged around the channel in the extension of the flap, where the peripheral edge of the support panel is attached against the collar;
  characterized in that it further comprises a reinforcing frame suited to fix the position of the guiding part relative to the support panel, where the reinforcing frame is a part brought in and force fit around the channel and fixed to the peripheral edge of the support panel.

The channel is provided with at least one locking element suited to block the reinforcing frame stopped against the peripheral edge of the support panel. The at least one locking element comprises an attachment tab for elastic nesting. The reinforcing frame comprises a ring extending in a plane parallel to the collar, and a skirt extending perpendicularly to the ring and tightening around the channel. The at least one locking element is bearing against a free end of the skirt. The ring is suited for flattening the peripheral edge of the support panel against the collar, where the ring comprises an outer edge and a central opening delimiting an inner edge, and in which the size of the ring defined between the inner edge and the outer edge is included between 5 mm and 50 mm and is, preferably, included between 10 mm and 30 mm.

The edge surrounding the channel comprises ribs extending along an axial direction; the reinforcing frame extends at least in part against these ribs. The reinforcing frame holds the peripheral edge of the support panel against the collar.

The invention also relates to a production process for a trim component for a vehicle, in particular for an automotive vehicle, where the trim component comprises a thermocompressed support panel, a reinforcing frame and an airbag guiding part comprising a channel, a flap at least partially closing a first end of the channel and a collar arranged around the channel in the extension of the flap, where the process comprises the following steps:
  arranging the reinforcing frame inside a molding cavity of a first mold part; —heating a support panel;
  arranging the heated support panel on the molding cavity of the first mold and on a portion of the reinforcing frame;
  cutting out an opening in the support panel facing the reinforcing frame;
  arranging the airbag guiding part in a molding cavity of a second mold part
  assembling the first mold part and the second mold part by inserting the channel of the guiding part into the opening of the support panel and into the reinforcing frame;
  attaching the support panel to the collar and to a part of the reinforcing frame while compressing the second mold part against the first mold part.

According to a specific embodiment, the channel of the guiding part is provided with at least one locking element, and wherein said at least one locking element deforms reversibly during insertion of the channel of the guiding part into the opening of the support panel and in the reinforcing frame, and then returns to the initial shape thereof for blocking the reinforcing frame stopped against a peripheral edge of the support panel.

DETAILED DESCRIPTION

Figure 1:
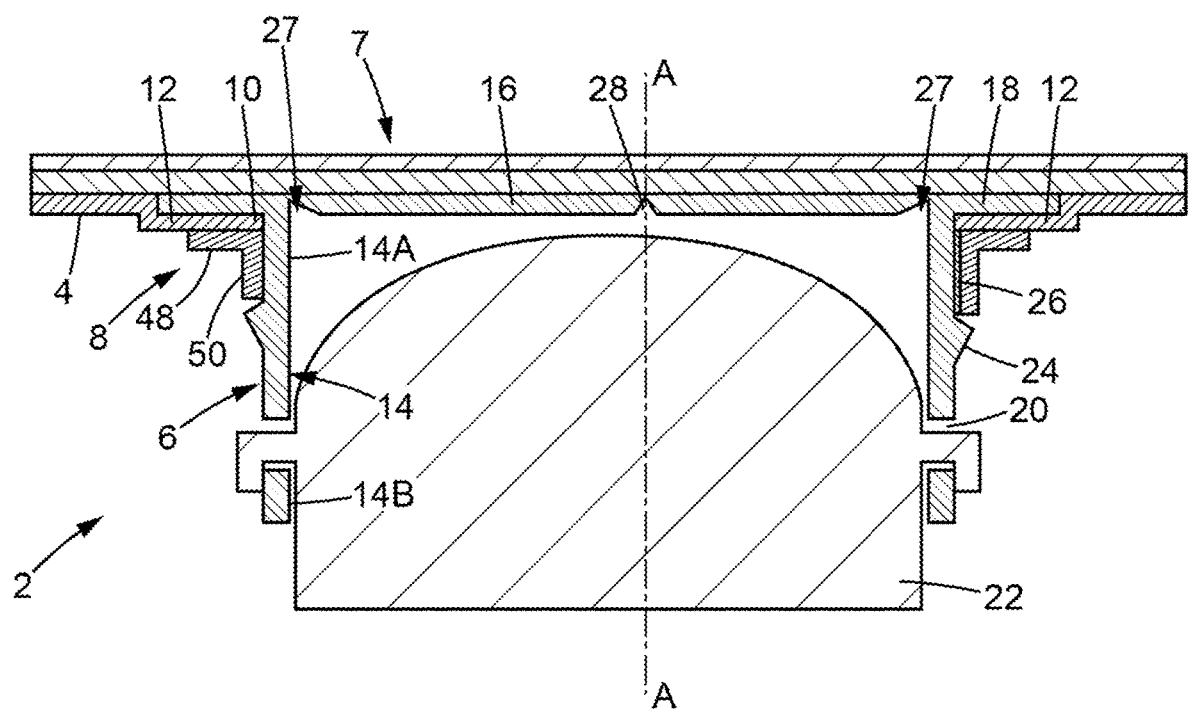
FIG. 1 is a partial schematic section of the vehicle trim component according to an embodiment of the invention.

In the description which follows, the terms "top," "bottom," "lower" and "upper" are defined when the trim component is arranged as shown on FIG. 1 and are in no way limiting.

Referring to FIG. 1, the trim component 2 of the vehicle according to an embodiment of the invention comprises a support panel 4, an airbag guiding part 6, a decorative covering 7 attached onto the support panel and onto a portion of the guiding part 6 and a reinforcing frame 8 attached onto the support panel.

The trim component 2 is for example a vehicle instrument panel or a portion of the vehicle instrument panel. As a variant, the trim component 2 is a vehicle center console or a vehicle door panel.

The support panel 4 gives the geometric shape thereof to the trim component 2.

The thermocompressed support panel 4 has a thickness of 1.4 mm to 2.5 mm.

The support panel 4, the guiding part 6 and the reinforcement frame 8 are attached to each other by hot pressing.

The support panel 4 is provided with a through opening 10 and a peripheral edge 12 surrounding the opening;

The support panel 4 is implemented by thermocompression. For example, the support panel 4 is made by hot pressing. The support panel 4 comprises fibers. The support panel 4 comprises for example natural fibers or a thermoplastic material. The natural fibers are for example hemp, wood, linen, kenaf and/or sisal fibers, preferably wood fibers. The thermoplastic material is for example polypropylene (PP) and/or polyethylene terephthalate (PET), preferably polypropylene (PP). The shape of the support panel 4 before thermocompression is a nonwoven mat comprising interlocking fibers. In a specific example, the nonwoven mat comprises interlocking natural and thermoplastic fibers. The nonwoven mat is for example formed by needling of fibers. The nonwoven mat has a thickness of 8 mm to 14 mm before the thermocompression step.

The airbag guiding part 6 comprises a channel 14, a flap 16 covering at least one part of a first end 14A of the channel 14 and a collar 18 arranged around the channel in the extension of the flap 16. The second end of the channel, opposite the first end 14A, is referenced 14B.

According to a specific embodiment, the guiding part 6 comprises several flaps 16 enclosing at least in part the first end of the channel 14, for example with two flaps 16, as shown in FIG. 1.

The guiding part 6 is preferably made from a single part by molding, for example by injection molding, of a plastic.

The channel 14 is arranged in the opening 10 of the support panel 4. It is generally called a firing channel. The channel 14 delimits an internal passage for deployment of the airbag into the vehicle's passenger compartment. The internal passage of the channel 14 is opposite an outer contour of the channel 14.

The channel 14 can guide an airbag when it deploys. The channel 14 has a tubular shape.

The channel 14 has, for example, a rectangular transverse section. The channel 14 comprises, for example, four walls that are pairwise opposite. The channel 14 extends around an axis A-A. The channel 14 extends from the first end 14A of the channel 14 to the second end 14B of the channel 14. The channel comprises near the second end 14B of the channel 14, stated differently in the lower part thereof, openings 20 in which a housing 22 is hooked. The housing 22 is also attached to channel 14 by attachment means not shown. The housing 22 contains a generator and an airbag. The generator can generate the deployment of the airbag. The airbag can deploy into the vehicle's passenger compartment by passing through the channel 14 when the vehicle undergoes an impact.

The perimeter of the channel 14 comprises in the median portion thereof, extending between the first end and the second end of the channel 14 locking elements 24 and/or ribs 26 shown schematically in the figures. The "perimeter of the channel 14" is understood to mean the outer contour of the channel 14, more specifically the outer surface of the walls of the channel 14. These ribs 26 extend in the area of the reinforcing frame 8. The reinforcing frame 8 bearing, at least in part against the ribs 26.

The channel 14 may for example comprise between 4 and 16 locking elements 24 and between 4 and 16 ribs 26, each arranged on a wall of the channel.

The locking elements 24 are specific for blocking the reinforcing frame 8 stopped against the peripheral edge 12 of the support panel 4. The locking elements 24 each comprise an elastically nesting attachment tab. Preferably, the elastically nesting attachment tabs are reversible. The elastically nesting attachment tabs deform during assembly and attachment of the guiding part 6 to the support panel 4. Then, they return to the initial shape thereof, as explained in the production process described below. Advantageously the locking elements 24 secure the attachment of the guiding part 6 to the support panel 4.

The ribs 26 are for example arranged between the locking elements 24 and the collar 18. Advantageously, the ribs allow a precise positioning of the reinforcing frame 8 relative to the guiding part 6.

The flap 16 at least partially closes the first end of the channel 14, otherwise called the upper end of the channel 14. The flap 16 is connected to the channel 14 by a hinge 27 around which the flap 16 is rotatable during airbag deployment from a closed position in which the flap 16 at least partially closes a portion of the first end of the channel 14 and an open position in which the flap 16 at least partially clears the first end of the channel 14. In the embodiment in which the guiding part 6 comprises several flaps 16 each flap 16 is connected to the channel 14 by a hinge 27 and a weakening line 28 is arranged at the junction between the flaps 16. For example, when the guiding part 6 comprises two flaps 16, a weakening line 28 is arranged at the junction between the two flaps 16 as shown in FIG. 1. The weakening line 28 is for example formed by a reduced thickness of the flap 16. The weakening line 28 can tear, advantageously without launching particles of the flap 16 into the passenger compartment, during airbag deployment.

The collar 18 is arranged around the first end 14A of the channel 14, in other words the upper end of the channel 14, in the extension of the flap 16.

"Arranged around the first end 14A of the channel 14," is understood to mean that the collar 18 extends from the first end 14A of the channel 14 towards the outside of the channel 14.

According to a specific embodiment, the collar 18 is arranged around the entirety of the first end of the channel 14.

The collar 18 forms with the flap 16 a substantially flat surface on which the decorative covering 7 is attached. The collar 18 has a bearing surface 30, a surface 32 opposite the bearing surface 30 and a segment 34 connecting the bearing surface 30 to the opposite surface 32.

The decorative covering 7 is attached onto the opposite surface 32.

Figure 3:
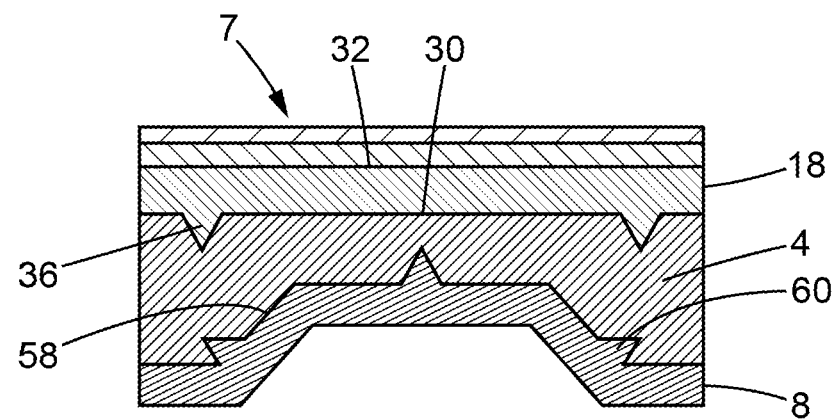
FIG. 3 is a section of a part of the trim component shown in FIG. 1.

The bearing surface 30 is attached by hot pressing to the peripheral edge 12 of the support panel 4. The bearing surface 30 is attached to an upper surface of the peripheral edge 12. Preferably the bearing surface 30 is provided with one or more reliefs 36 for increasing the adhesion of the collar 18 to the support panel 4, as shown in FIG. 3. These reliefs 36 are, for example, made up of pins, ribs, nubs, etc. These reliefs 36 increase the surface area for adhesion. These reliefs, for example, have a height included between 0.5 mm and 2.5 mm. The density of these reliefs is included between 5 and 15 per square centimeter.

Figure 4:
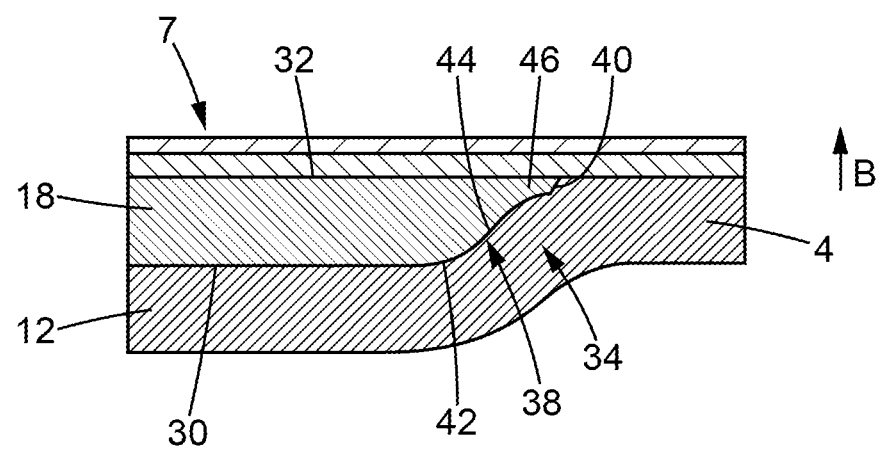
FIG. 4 is an enlarged part of FIG. 2.

Referring to FIG. 4, the segment 34 of the collar 18 has, in a direction B starting from the bearing surface 30 and going towards the opposite surface 32, an S-shaped profile 38 and a chamfer 40 serving to improve the attachment of the support panel to the guiding part and assuring the flatness of the interface between the guiding part and the support panel.

In particular, the S-shaped profile 38 comprises, in the direction B, a first rounded surface 42, having a center of curvature located inside the collar 18, followed by a substantially flat surface 44 that is inclined relative to a vertical plane, continued by a second rounded surface 46 having a center of curvature outside of the collar 18.

Preferably, the surface 44 has an angle of inclination a include between 0° and 30° relative to a vertical plane.

The chamfer 40 delimits a portion of reduced thickness located near the segment 34, forming a step at the end of the collar 18. It serves to avoid a defect such as, for example, a burr during injection of the collar 18 of the guiding part 6. The thickness of the collar 18 at the beginning of the chamfer is substantially 0.5 mm.

Preferably, the chamfer 40 has an angle of inclination β included between 0° and 60° relative to a vertical plane.

A decorative covering 7 is attached to the support panel 4, the collar 18 and the flap 16. It can be torn when the flap 16 opens and the airbag deploys.

In the embodiment shown in FIG. 1, the decorative covering 7 comprises a foam layer and an outer covering. The decorative covering 7 has a thickness included between 0.8 mm and 3.5 mm. The foam layer extends between the outer covering and the surface formed by the support panel 4, the collar 18 and the flap 16. The outer covering may be made of any type of skin such as, for example, a polypropylene, textile or leather covering.

The reinforcing frame 8 is a part brought in and arranged around the channel 14. The reinforcing frame 8 is attached to the peripheral edge 12 of the support panel 4 by hot pressing. The reinforcing frame 8 is attached to a lower surface of the peripheral edge 12, opposite from the upper surface of the peripheral edge 12. The reinforcing frame 8 is suited for fixing the position of the guiding part 6 relative to the support panel 4. In particular, it serves to flatten and attach the peripheral edge 12 of the support panel 4 against the collar 18 during the hot-pressing operation. In that way, the peripheral edge 12 of the support panel 4 is held between the reinforcing frame 8 and the collar 18.

Figure 5:
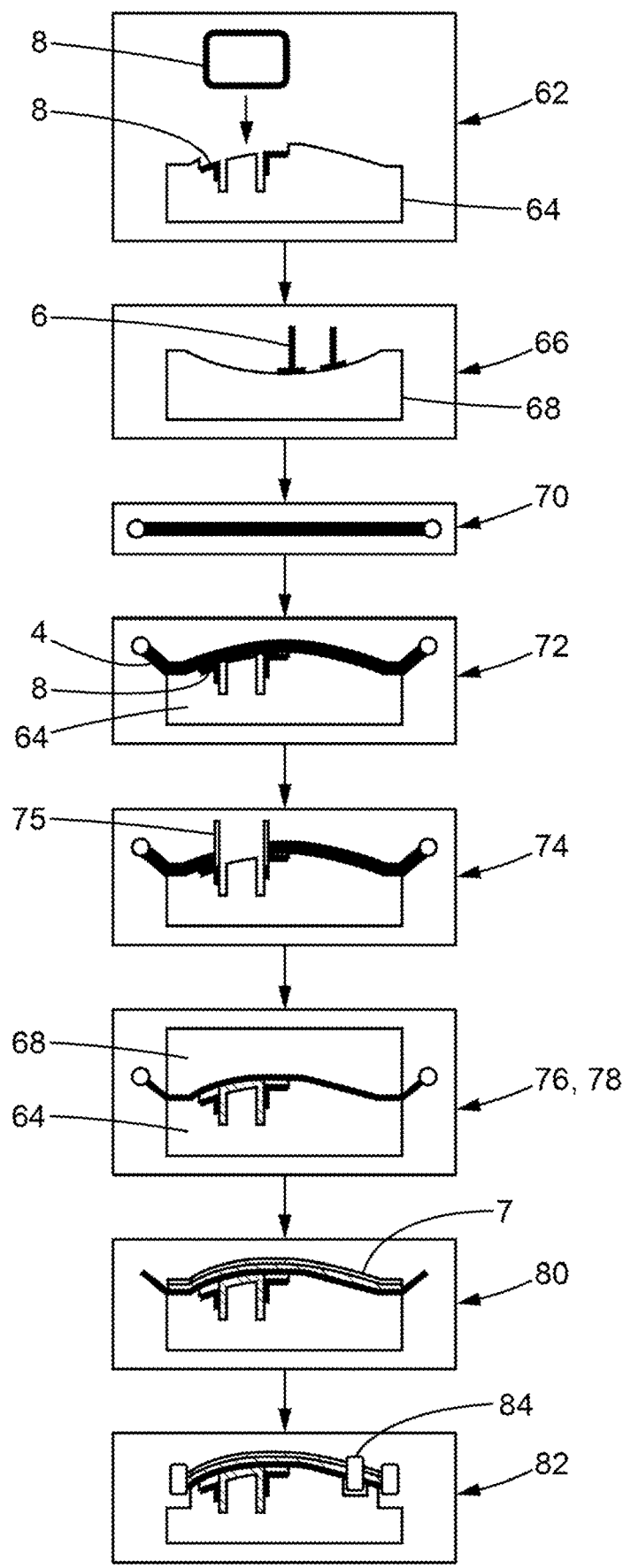
FIG. 5 is a diagram of the steps from the production process of the trim component

The reinforcing frame 8 has a shape complementary to the shape of the channel 14. In that way, the reinforcing frame 8 has, for example, a substantially rectangular shape comprising four branches, as shown in FIG. 5. The reinforcing frame 8 is preferably made from a single part by molding, for example by injection molding, of a plastic, comprising for example polypropylene.

The reinforcing frame 8 comprises a ring 48 extending in a plane substantially perpendicular to the axial direction A-A, and a skirt 50 extending substantially perpendicularly to the ring 48. Each branch of the reinforcing frame 8 has an L-shaped section.

Figure 2:
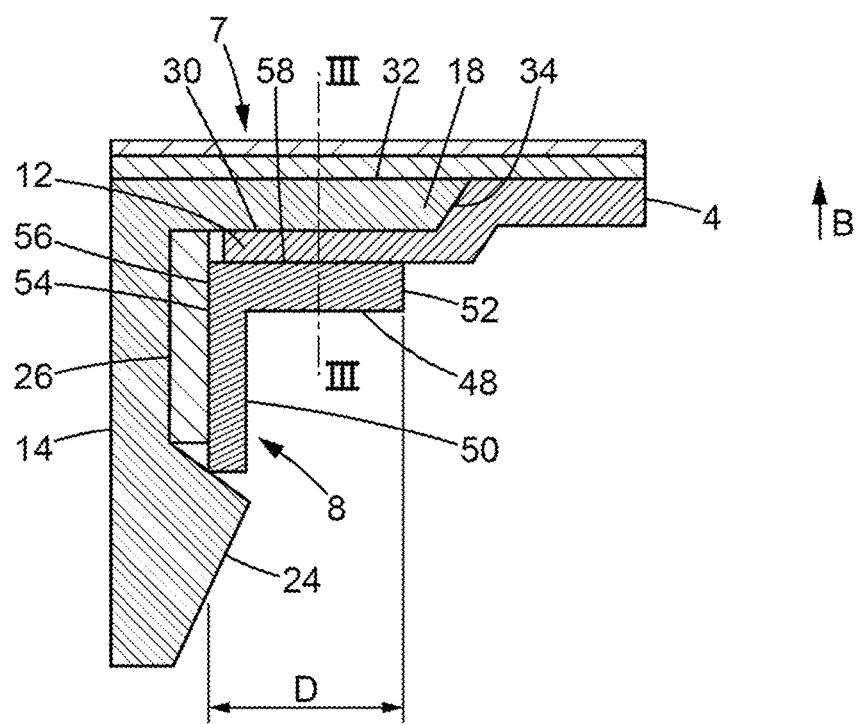
FIG. 2 is an enlarged part from FIG. 1.

With reference to FIG. 2, the ring 48 comprises a free outer edge 52 and a central opening 54 delimiting an inner edge 56. The skirt 50 extends from the inner edge 56 of the ring 48 towards a lower edge of the ring 48. The skirt 50 extends between one end linked to the ring 48 and one free end, opposite the end linked to the ring 48. Preferably, the dimension D of the ring 48 defined between the inner edge 56 and the outer edge 52 is included between 5 mm and 50 mm and is, preferably, included between 10 mm and 30 mm.

This dimension between the inner 56 and outer 52 edges also serves to remedy a positioning defect of the cut out of the support panel.

The inner edge 56 of the ring 48 is in contact with the ribs 26 of the channel 14 in order to assure a precise positioning of the reinforcing frame 8 relative to the guiding part 6.

The ring 48 comprises a surface 58 attached by hot pressing to the peripheral edge 12 of the support panel. Preferably, this surface 58 is provided with one or more reliefs 60 for increasing the adhesion of the ring to the support panel. These reliefs 60 are made up of pins, ribs or nubs, as can be seen in FIG. 3. These reliefs 60, for example, have a height included between 0.5 mm and 2.5 mm. The density of these reliefs is included between 5 and 15 per square centimeter.

The skirt 50 has a shape complementary to the channel 14. It is nested around the channel.

Advantageously, the skirt 50 reinforces the stability and proper positioning of the reinforcing frame 8 relative to the guiding part 6.

The locking elements 24 of the guiding part 6 are bearing against the free end of the skirt 50.

As a variant, the channel 14 comprises a single locking element 24.

As a variant, the elastically nesting attachment tabs are not reversible. In this case, the deformed position thereof after assembly allows them to block the reinforcing frame 8 stopped against the peripheral edge 12 of the support panel.

According to an embodiment, the ring 48 comprises a surface 58 attached to the peripheral edge 12 of the support panel, and in which said surface 58 of the ring is equipped with at least one relief 60 for increasing the adhesion of the ring 48 to the support panel 4.

According to an embodiment, the collar 18 comprises a bearing surface 30 attached to the peripheral edge 12 of the support panel 4, where said bearing surface 30 is provided with at least one relief 36 for increasing the adhesion of the collar 18 to the support panel 4.

According to an embodiment, the collar 18 comprises a bearing surface 30 attached to the peripheral edge 12 of the support panel 4, where a surface 32 opposite to the bearing surface and a segment 34 connect the bearing surface 30 to the opposite surface 32, and where the segment 34 comprises, along a direction starting from the bearing surface 30 and going towards the opposite surface 32, an S-shaped profile 38 and a chamfer 40.

According to an embodiment, the reinforcing frame 8 is made of plastic.

Referring to FIG. 5, the production process for the trim component begins by a step 62 during which the reinforcement frame 8 is arranged inside a molding cavity of a first mold part 64.

During this step 66, the airbag guiding part 6 is laid out in a molding cavity of a second mold part 68.

During a step 70, the support panel 4 is heated to a temperature included between 160° and 220° C., preferably between 200° and 220° C., and in particular between 205° and 210° C.

During a step 72, the heated support panel 4 is placed on the mold cavity of the first mold part 64 and on the reinforcing frame 8, in particular on the ring 48 of the reinforcing frame. The support panel starts to deform, in particular by gravity and/or by an action of the mold, for matching the shape of the mold cavity of the first mold part 64 and the reinforcing frame 8.

During a step 74, an opening 10 is cut in the support panel by cutting elements 75. The cutting element 75 come to bear on the reinforcing frame 8 for cutting the opening 10.

During a step 76, the first mold part 64 and the second mold part 68 are assembled by inserting the channel 14 of the guiding part 6 in the opening 10 of the support panel 4 and in the reinforcing frame 8. During insertion of the channel 14 into the reinforcing frame 8, the elastically deforming attachment tabs of the locking elements 24 deform. Then they return to the initial position thereof. In this initial position, the attachment tabs are arranged against the free end of the skirt 50 of the reinforcing frame 8. They form a safety stop should the attachment by hot pressing separate.

During this step 78, the first mold part 64 and the second mold part 68 are compressed against each other. During this compression, the peripheral edge 12 of the support panel 4 is attached against the collar 18 of the guiding part 6 and against the reinforcing frame 8, in particular against the ring 48 of the reinforcing frame 8. The compression step 78 must be done at most 20 seconds after heating the support panel.

During this step 80, the decorative covering 7 is attached on the upper surface of the support panel 4 and on the upper surface of the flap 16 and the collar 18.

During an optional step 82, openings 84 are made through the decorative covering 7 of the support panel 4. These openings are intended to allow equipment such as a radio or a vent to pass through. The steps of the process take place from step 62 to step 82, as shown in FIG. 5.

The invention claimed is:

1. A vehicle trim component, the trim component comprising:
   a thermocompressed support panel provided with an opening and a peripheral edge surrounding the opening;
   an airbag guiding part comprising a channel arranged in the opening of the support panel, a flap at least partially closing a first end of the channel, and a collar arranged around the channel in an extension of the flap, wherein the peripheral edge of the support panel is attached against the collar; and
   a reinforcing frame configured to fix the position of the guiding part relative to the support panel, wherein the reinforcing frame is force fit around the channel and fixed to the peripheral edge of the support panel.

2. The vehicle trim component according to claim 1, wherein the channel is provided with at least one locking element suited to block the reinforcing frame stopped against the peripheral edge of the support panel.

3. The vehicle trim component according to claim 2, wherein the at least one locking element comprises an attachment tab for elastic nesting.

4. The vehicle trim component according to claim 1, wherein the reinforcing frame comprises a ring extending in a plane parallel to the collar, and a skirt extending perpendicularly to the ring and tightening around the channel.

5. The vehicle trim component according to claim 4, wherein the channel is provided with at least one locking element suited to block the reinforcing frame stopped against the peripheral edge of the support panel and wherein said at least one locking element bears against a free end of the skirt.

6. The vehicle trim component according to claim 5, wherein the ring is suited for flattening the peripheral edge of the support panel against the collar, wherein the ring comprises an outer edge and a central opening delimiting an inner edge, and wherein the dimension of the ring defined between the inner edge and the outer edge is between 5 mm and 50 mm, inclusive.

7. The vehicle trim component according to claim 6, wherein the dimension is between 10 mm and 30 mm, inclusive.

8. The vehicle trim component according to claim 4, wherein the ring is configured for flattening the peripheral edge of the support panel against the collar, wherein the ring comprises an outer edge and a central opening delimiting an inner edge, and wherein the dimension of the ring defined between the inner edge and the outer edge is between 5 mm and 50 mm, inclusive.

9. The vehicle trim component according to claim 8, wherein the dimension is between 10 mm and 30 mm, inclusive.

10. The vehicle trim component according to claim 1, wherein an edge surrounding the channel comprises ribs extending along an axial direction, and wherein the reinforcing frame extends at least in part against these ribs.

11. The vehicle trim component according to claim 1, wherein the reinforcing frame holds the peripheral edge of the support panel against the collar.

12. A production process for the trim component of claim 1, wherein the process comprises the following steps:
   arranging the reinforcing frame inside a molding cavity of a first mold part;
   heating a support panel;
   arranging the heated support panel on the molding cavity of the first mold and on a portion of the reinforcing frame;
   cutting out the opening in the support panel facing the reinforcing frame;
   arranging the airbag guiding part in a molding cavity of a second mold part;
   assembling the first mold part and the second mold part by inserting the channel of the guiding part into the opening of the support panel and into the reinforcing frame; and
   attaching the support panel to the collar and to a part of the reinforcing frame while compressing the second mold part against the first mold part.

13. The production process according to claim 12, wherein the channel of the guiding part is provided with at least one locking element, and wherein said at least one locking element deforms reversibly during insertion of the channel of the guiding part into the opening of the support panel and in the reinforcing frame, and then returns to the initial shape thereof for blocking the reinforcing frame stopped against a peripheral edge of the support panel.

* * * * *